United States Patent [19]
Janke

[11] Patent Number: 5,255,530
[45] Date of Patent: Oct. 26, 1993

[54] SYSTEM OF TWO ZONE REFRIGERATOR TEMPERATURE CONTROL

[75] Inventor: Donald E. Janke, Benton Township, Berrien County, Mich.

[73] Assignee: Whirlpool Corporation, Benton Harbor, Mich.

[21] Appl. No.: 973,861

[22] Filed: Nov. 9, 1992

[51] Int. Cl.$^5$ ............................................. F25D 17/08
[52] U.S. Cl. ............................................. 62/180; 62/181; 62/186; 62/228.4; 62/229
[58] Field of Search ............... 62/180, 181, 183, 186, 62/187, 228.4, 228.5, 229, 215, 203, 204

[56] References Cited

U.S. PATENT DOCUMENTS

| | | | |
|---|---|---|---|
| 2,801,526 | 8/1957 | Dolley, Jr. | 62/6 |
| 3,015,215 | 1/1962 | Tobey | 62/96 |
| 3,090,209 | 5/1963 | Hubacker | 62/180 |
| 3,107,502 | 10/1963 | Herndon, Jr. et al. | 62/180 |
| 3,359,751 | 12/1967 | Stevens | 62/186 |
| 4,257,238 | 3/1981 | Kountz et al. | 62/176 |
| 4,364,237 | 12/1982 | Cooper et al. | 62/160 |
| 4,459,519 | 7/1984 | Erdman | 318/254 |
| 4,481,787 | 11/1984 | Lynch | 62/180 |
| 4,662,185 | 5/1987 | Kobayashi et al. | 62/228.4 |
| 4,718,247 | 1/1988 | Kobayashi et al. | 62/228.4 |
| 4,949,548 | 8/1990 | Meyer | 62/98 |
| 4,959,969 | 10/1990 | Okamoto et al. | 62/228.4 X |

Primary Examiner—Harry B. Tanner
Attorney, Agent, or Firm—Stephen D. Krefman; Thomas J. Roth; Thomas E. Turcotte

[57] ABSTRACT

A control for a refrigerator having a freezer compartment, a fresh food compartment, and a refrigeration system having an evaporator disposed within the freezer compartment, a condenser, and a compressor for compressing the refrigerant in the system. The refrigerator includes a variable speed motor to drive the compressor, a variable speed condenser fan for moving air over the condenser, and a variable speed evaporator fan for circulating air over the evaporator and to the freezer compartment and fresh food compartment. Means are provided for responding to the temperature within the fresh food compartment for varying the speed of the evaporator fan such that the temperature of the fresh food compartment is controlled. Means are provided for responding to the temperature within the freezer compartment for varying the speed of the compressor motor and the condenser fan such that the temperature of the freezer compartment is controlled. Thus, the fresh food compartment is controlled by varying the speed of the evaporator fan and the freezer compartment is controlled by varying the speed of the condenser fan and compressor motor.

16 Claims, 5 Drawing Sheets

TEMPERATURE CONTROL ZONES

FREEZER ZONE

| TEMPERATURE | COMP. MOTOR & COND. FAN MOTOR |
|---|---|
| OK | NO CHANGE |
| COOL | DECREASED |
| WARM | INCREASED |

FRESH FOOD ZONE

| TEMPERATURE | EVAP. FAN MOTOR |
|---|---|
| OK | NO CHANGE |
| COOL | DECREASED |
| WARM | INCREASED |

SYSTEM OF TWO ZONE REFRIGERATOR TEMPERATURE CONTROL

BACKGROUND OF INVENTION

1. Field of the Invention

The present invention relates to a refrigerator temperature control system in which a compressor for compressing a refrigerant, an evaporator fan for moving air about an evaporator and a condenser fan for moving air about a condenser are driven at variable speeds for controlling the temperatures of a freezer compartment and a fresh food compartment.

2. Description of the Prior Art

In a refrigerator having a freezer compartment and a fresh food compartment, the temperature of the respective freezer and fresh food compartments, gradually rise due to heat transfer through the walls and door of the refrigerator as well as from the frequent opening of the door or doors of these compartments and loading therein of foods or the like. Various methods for controlling the temperature of the respective freezer and fresh food compartments are known.

Typically, a refrigerator may include a refrigeration system having a compressor motor, an evaporator fan motor and a condenser fan motor which cycle on together in response to higher than desired temperatures in the freezer compartment and cycle off together when the desired temperature in the freezer compartment is achieved. The temperature within the fresh food compartment is typically controlled by a baffle disposed within an air duct for providing air control means for varying the recirculation of air within the refrigerator between the freezer compartment and the fresh food compartment.

Another known method of controlling the temperatures within the respective freezer compartments and fresh food compartments are disclosed by R. E. Tobey in U.S. Pat. No. 3,015,215. Tobey discloses using a two speed continuously operating evaporator fan motor for controlling the temperature of the fresh food compartment. When the fresh food compartment is at or below a desired temperature, the evaporator fan motor operates at a low speed to circulate an air stream from the freezer compartment to the fresh food compartment. When the fresh food compartment is above the desired temperature, the evaporator fan motor operates at a high speed to increase air circulation between the freezer compartment and the fresh food compartment. A single speed compressor motor and condenser fan motor is independently cycled on and off to maintain the freezer compartment at the desired temperature.

F. L. Stevens, in U.S. Pat. No. 3,359,751, discloses a method for controlling a two temperature refrigerator using two separate evaporator fans in a side-by-side refrigerator application. The Stevens patent discloses a system having a compressor motor and condenser fan motor and a first evaporator fan which are cycled on and off together for controlling the freezer compartment temperature. A second evaporator fan is cycled on and off for controlling the fresh food compartment.

All of the above described refrigeration control methods utilize cycling on and off a compressor motor, an evaporator fan motor and a condenser fan motor for temperature control. This cycling in an on-off manner of the compressor motor, evaporator fan and condenser fan must occur quite often to keep the respective temperatures of the freezer and fresh food compartments within desired ranges. However, frequent starting and stopping tends to decrease the operating life of the system. Each start up of a motor causes relatively high currents to be fed to the motor windings, thereby causing heating of the electrical power driving components and the motor itself, and also causes power losses within the motor windings. Further, it is believed that an energy loss of as much as 10-15% may occur when a compressor is cycled on and off at particular cycle rates. This significant energy loss is believed to be due to the migration of liquid refrigerant to ineffective cooling locations within the refrigeration system. For example, liquid refrigerant may migrate, during the off condition of the compressor, to locations beyond the evaporator, and upon subsequent restart of the compressor, the liquid refrigerant vaporizes outside the evaporator where no cooling effect is acquired as a result of such vaporization.

The above described undesirable results of cycling the compressor motor, evaporator fan motor and condenser fan motor may be overcome by utilizing variable speed motors. Erdman, in U.S. Pat. No. 4,459,519, disclosed an arrangement for utilizing a variable speed compressor motor and evaporator fan motor for controlling the temperature of a single temperature refrigerator. Erdman discloses varying the evaporator fan speed for controlling the temperature of the single compartment temperature. Feedback from the fan speed controls the desired temperature setting of the evaporator and the compressor motor speed is varied to achieve the desired temperature setting of the evaporator.

Therefore, it would be desirable to develop an improved control arrangement for controlling the temperatures within a refrigerator having a freezer compartment and a fresh food compartment in which the control arrangement utilizes variable speed motors for achieving the above stated beneficial effect. Further, it would be desirable to develop an improved control arrangement for controlling the temperatures within a refrigerator having a freezer compartment and a fresh food compartment and which utilizes variable speed motors and wherein the refrigerator does not require a separate movable baffle arrangement for controlling air recirculation from the freezer compartment to the fresh food compartment.

SUMMARY OF INVENTION

In general, a control arrangement is provided for a refrigerator having a freezer compartment, a fresh food compartment, and a refrigeration system having an evaporator disposed within the freezer compartment, a condenser, and a compressor for compressing the refrigerant in the system. The control arrangement includes a variable speed motor to drive the compressor, a variable speed condenser fan for moving air over the condenser, and a variable speed evaporator fan for circulating air over the evaporator and to the freezer compartment and fresh food compartment. Means are provided for responding to the temperature within the fresh food compartment for varying the speed of the evaporator fan such that the temperature of the fresh food compartment is controlled. Furthermore, means are provided for responding to the temperature within the freezer compartment for varying the speed of the compressor motor and the condenser fan such that the temperature of the freezer compartment is controlled. Thus in the control arrangement of the present invention, the fresh food compartment is controlled by varying the speed of the evaporator fan and the freezer compartment is controlled by varying the speed of the condenser fan and compressor motor. Thus in this arrangement, a two zone control system is provided.

A primary object of the present invention is to provide a refrigeration system and control arrangement for varying the compressor speed and condenser fan speed in response to the freezer compartment temperature and the evaporator fan speed in response to the fresh food compartment for providing two zone temperature control. Another object is to provide a refrigerator system and control arrangement which will improve operating life of the system components. A further object of the invention is to provide a refrigeration system and control arrangement which will improve the operating efficiency of the system. A further object of the invention is to provide a refrigeration system having a variable speed compressor motor and evaporator fan motor and two different temperature zones that is relatively less expensive than refrigeration systems having variable speed compressor motors and evaporator fan motors and two temperature zones but which requires a movable baffle arrangement for controlling air flow between the freezer compartment and the fresh food compartment.

Other objects and advantages of the present invention may become apparent to those skilled in the Art, upon reference to the accompanying description when taken in conjunction with the following drawings.

DESCRIPTION OF PREFERRED EMBODIMENTS

Figure 1:
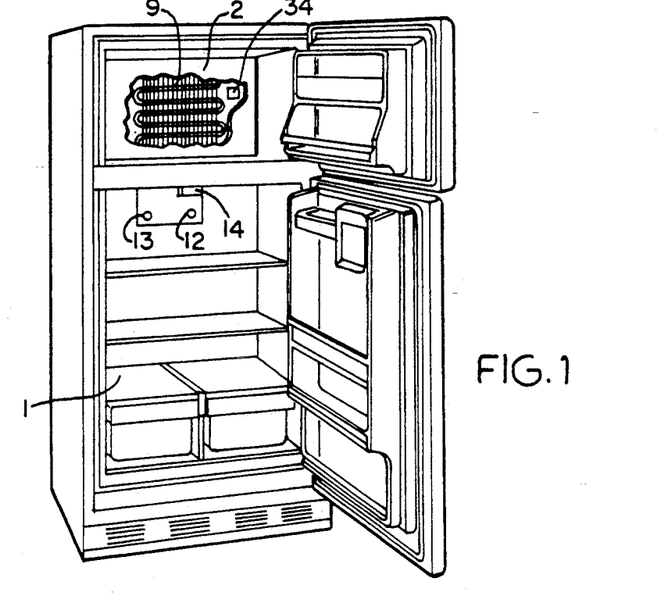
FIG. 1 is a perspective front view of a combination fresh food-freezer refrigerator in which the present invention is incorporated, the refrigerator having its access doors in an open position.

In the exemplary embodiment of the invention as disclosed in FIG. 1, a refrigerating apparatus is shown including a relatively high temperature fresh food compartment 1 and a relatively low temperature freezer compartment 2. An evaporator 9 is shown located in the freezer compartment 2.

Figure 2:
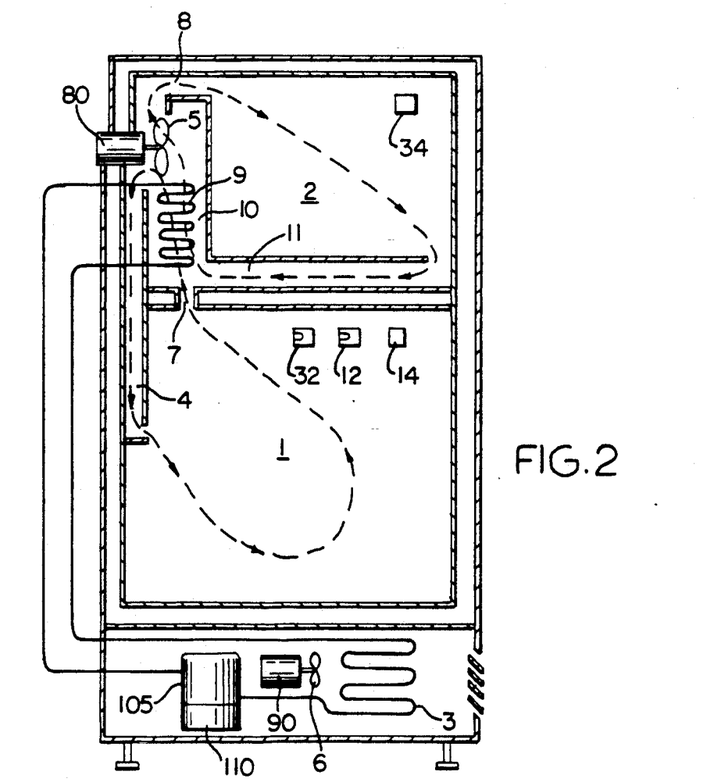
FIG. 2 is a schematic diagram showing the refrigeration system of the present invention.

In FIG. 2, a refrigerating apparatus is shown including means forming the relatively high temperature fresh food compartment 1 and means forming the relatively low temperature freezer compartment 2. The evaporator 9 is located in an evaporator chamber 10 which is located within the freezer compartment. In order to maintain the compartments at the desired temperature levels, a refrigeration system is provided which comprises a compressor 105, a condenser 3 and the evaporator 9 in fluid communication with each other. A direct current variable speed compressor motor 110 is coupled to the compressor 105 and causes the compressor 105 to move refrigerant through the refrigeration system as is well known.

An evaporator fan 5, driven by an evaporator motor 80, recirculates a first stream of air downwardly through a first air duct 4, into the fresh food compartment 1, up through a second air duct 7, and through the evaporator passage 10. The evaporator fan 5 also recirculates a second stream of air upwardly through a third air duct 8, into the freezer compartment 2, into a fourth air duct 11 and up through the evaporator passage 10. The refrigerant evaporator 9 is of conventional construction and is disposed in the chamber 10 for heat transfer relationship with the first and second streams of air passing there through as well as heat transfer directly by radiation and conduction between the evaporator and the freezer compartment 2.

A condenser fan 6 is continuously driven by a variable speed condenser fan motor 90 to cause air flow around the condenser to promote heat transfer between the condenser and the surrounding air.

Located within fresh food compartment 1 is a first temperature sensing means 14 comprising a thermistor, a first adjustable temperature setting means 12 and a second adjustable temperature setting means 32. Located within the freezer compartment 2 is a second temperature sensing means 34 comprising a thermistor.

Figure 3:
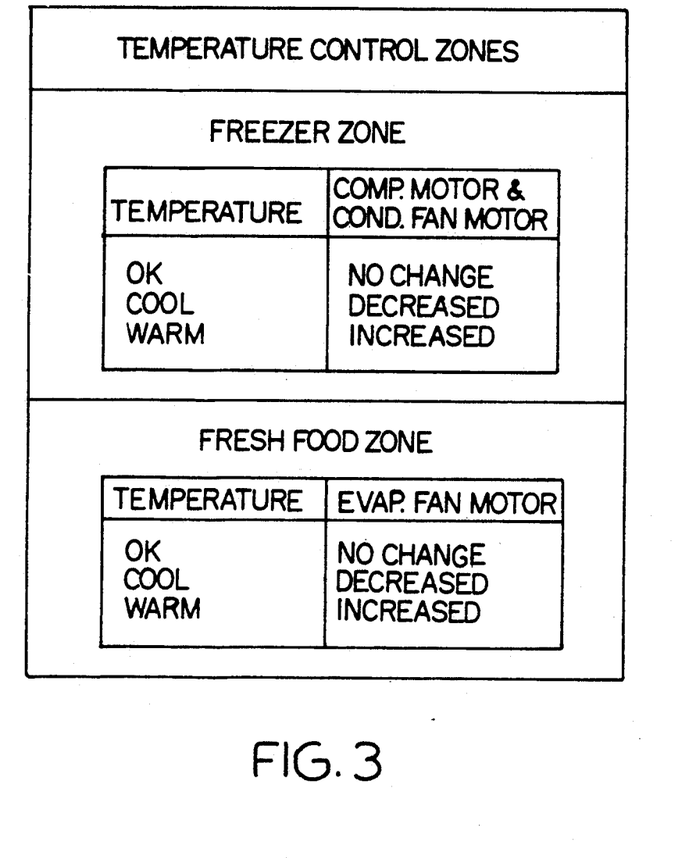
FIG. 3 is a chart representing the control scheme of the present invention.

The fresh food compartment 1 and the freezer compartment 2 comprise two separate temperature control zones. The freezer zone is controlled by varying the speed of the compressor motor. As indicated in FIG. 3, when the temperature of the freezer zone is at the desired temperature, no change in the speed of the compressor motor occurs (NO CHANGE). When the freezer zone is cooler than desired (COOL), the speed of the compressor motor is decreased (DECREASED). when the freezer zone is warmer than desired (WARM), the compressor motor speed is increased (INCREASED). The compressor motor speed is controlled, therefore, to vary the rate of refrigerant flow through evaporator 9 in accordance with the difference between the temperature of the freezer compartment 2 measured by second temperature sensing means 34 and the desired temperature of the freezer compartment 2 controlled by the second setting means 32. The condenser fan motor speed is directly related to the speed of the compressor motor 110 such that the condenser fan speed increases as the compressor motor speed increases and the condenser fan speed decreases as the compressor motor speed decreases.

Looking further at FIG. 3, the fresh food zone is controlled by varying the speed of the evaporator fan motor. When the temperature of the fresh food zone is at the desired temperature (OK), no change in the speed of the evaporator fan motor occurs (NO CHANGE). When the fresh food zone is cooler than desired (COOL), the speed of the evaporator fan motor is decreased (DECREASED). When the fresh food zone is warmer than desired (WARM), the speed of the evaporator fan motor is increased (INCREASED). The evaporator fan motor speed is varied, therefore, in accordance with the difference between the fresh food compartment temperature measured by first temperature sensing means 14 and the desired fresh food compartment temperature controlled by the temperature setting of temperature setting means 12. Thus, temperature control of the fresh food compartment 1 and the freezer compartment 2 is accomplished by two totally independent control systems.

Figure 4:
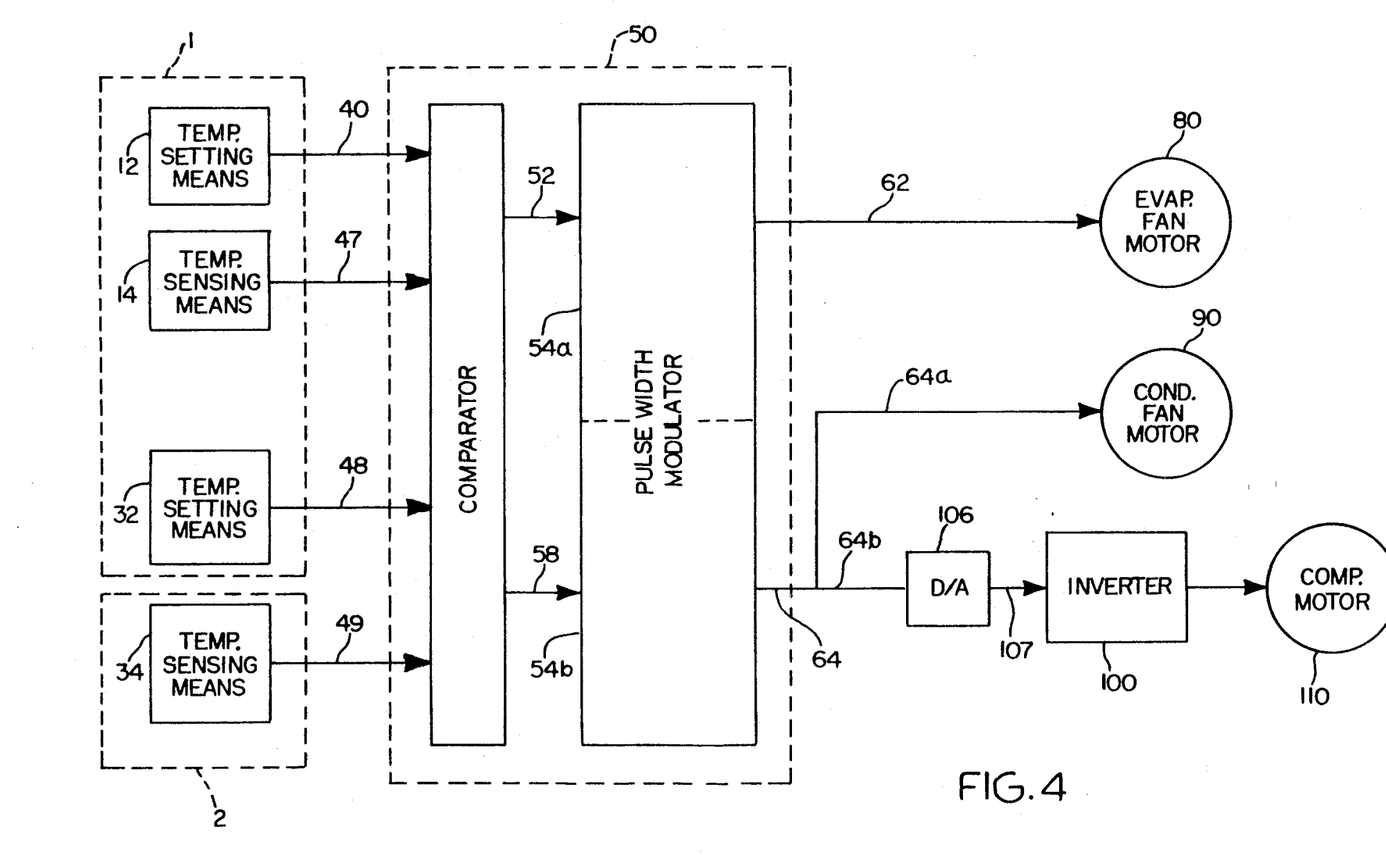
FIG. 4 is a schematic block diagram of a control arrangement of the present invention.

FIG. 4 shows a block diagram illustrating a control arrangement particularly adapted for use with the refrigeration system of the present invention. The first temperature sensing means 14 is shown with the first temperature setting means 12 and second temperature setting means 32 together in the fresh food compartment 1. The second temperature sensing means 34 is shown in the freezer compartment 2.

The first temperature setting means 12 sends an analog reference signal to a microprocessor 50 on line 40 which is indicative of the desired temperature of the fresh food compartment. The first temperature sensing means 14 sends an analog signal to the microprocessor 50 on line 47 which is indicative of the actual temperature of the fresh food compartment. The second temperature setting means 32 sends an analog reference signal to the microprocessor 50 on line 48 which is indicative of the desired freezer temperature. The second temperature sensing means 34 sends an analog signal to the microprocessor 50 on line 49 which is indicative of the actual temperature of the freezer compartment.

The microprocessor 50 is of a type well known in the Art. One version which has demonstrated satisfactory performance is 68HCO5. The microprocessor 50 includes a comparator 51 and pulse width modulators. The analog signals on lines 40 and 47 for fresh food compartment 1 are compared by the comparator 51. The comparator 51 sends an output speed control signal on line 52 to a pulse width modulator 54a, according to the compared difference between the signals on lines 40 and 47. The pulse width modulator 54a produces output pulse signals on line 62 according to the magnitude of the input speed control signal on line 52. The output pulse signal on line 62 varies the speed of the evaporator fan motor 80 to control fresh food compartment 1 temperatures. The signals on lines 48 and 49 for freezer compartment 2 are also compared by the comparator 51. The comparator 51 sends out an output control signal on line 58 to a pulse width modulator 54b, according to the compared difference between signals on lines 48 and 49. The pulse width modulator 54b produces an output pulse signal on line 64 according to the magnitude of the input speed control signal on line 58. The output pulse signal on line 64a varies the speed of the condenser fan motor 90. The output pulse signal on line 64b is converted from a digital to an analog signal via a digital to analog (D/A) converter 106. The analog signal is fed on line 107 into an inverter 100. The inverter 100 drives compressor motor 110. Therefore the output pulse signal on line 64a and 64b vary the condenser fan speed and compressor motor speed to control the freezer compartment temperature.

Figure 5:
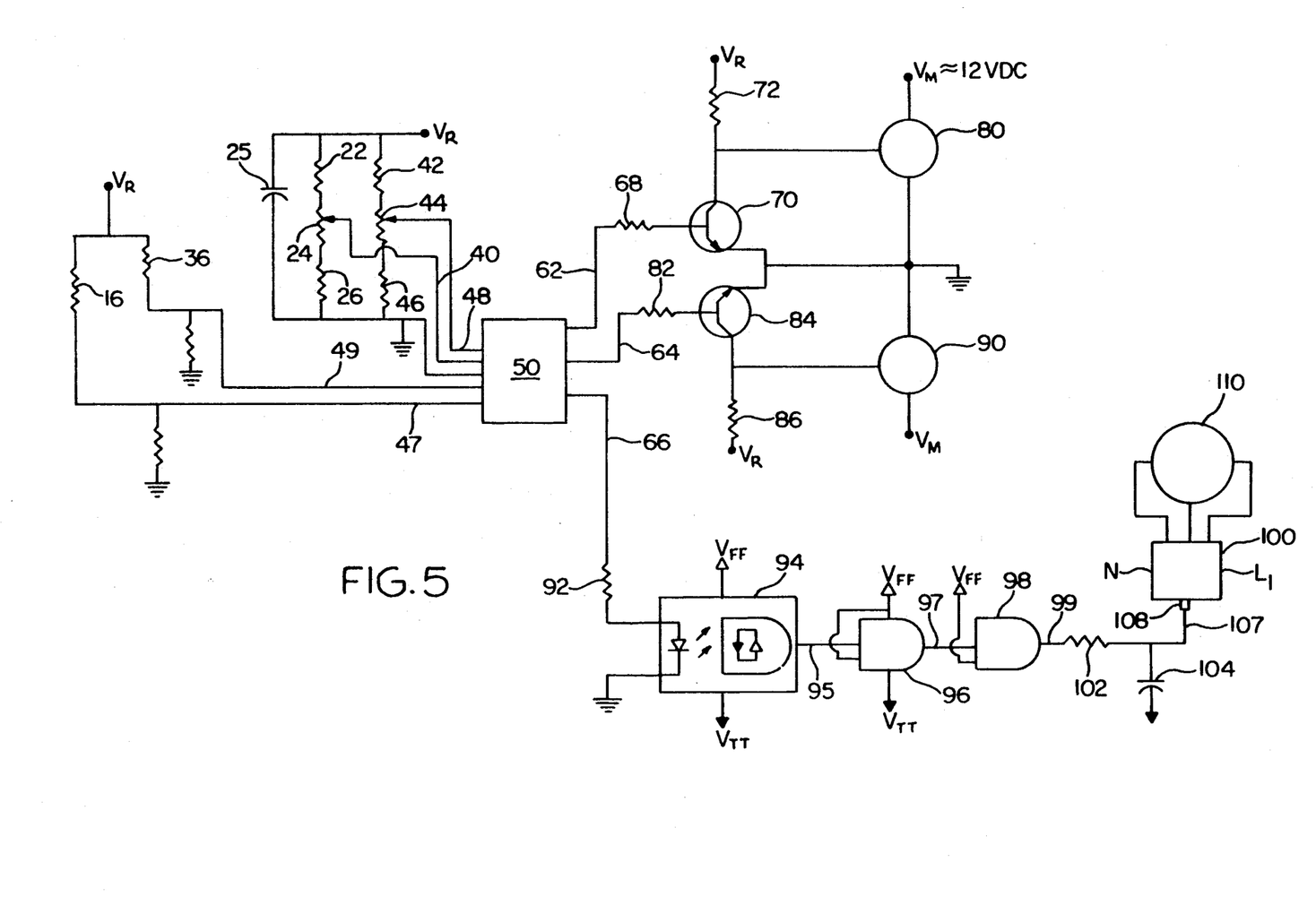
FIG. 5 is a schematic representation of a control arrangement for use with a refrigeration system in practicing the present invention in one preferred form.

FIG. 5 illustrates details of the control arrangement circuit of FIG. 4.

The first temperature sensing means 14 of fresh food compartment comprises a negative temperature coefficient thermistor 16 connected to a regulated voltage source, VR, for generating the signal representative of the temperature within fresh food compartment 1 on line the 47.

The first temperature setting means 12 comprises a voltage dividing network comprising resistors 22, 24, and 26 with a filtering capacitor 25. The desired fresh food compartment 1 temperature is adjusted by adjusting the variable resistor 24. The temperature setting means provides the analog reference signal which is indicative of a desired fresh food compartment 1 temperature on the line 40.

The second temperature sensing means 34 of freezer compartment 2 consists of a negative temperature coefficient thermistor 36 connected to a regulated voltage source, VR, for generating the analog signal representative of the temperature within the freezer compartment 2 on the line 49.

The second temperature setting means 32 consists of a voltage dividing network comprising resistors 42, 44, and 46 with a filtering capacitor 25. The desired freezer compartment 2 temperature is adjusted by adjusting the variable resistor 44. The temperature setting means provides the analog reference signal which is indicative of a desired freezer compartment 2 temperature on the line 48.

As described earlier, microprocessor 50 compares the signals on the lines 40 and 47 and the signals on the lines 48 and 49. Microprocessor 50 then provides pulse signals on lines 62 and 64 to control the evaporator fan motor 80, the condenser fan motor 90 and the compressor motor 110 as described above.

The pulse signal on line 62 is fed through resistor 68 and into a transistor 70. The transistor 70 inverts the output signal and serves as a buffer between the evaporator fan motor 80 and the microprocessor 50. The evaporator fan motor 80 is of an electrically commutated motor (ECM) type which is known in the Art and in which speed control of the motor is obtained with the input of a pulse width modulated signal.

The pulse signal on line 64 is fed through resistor 82 and into a transistor 84. The transistor 84 inverts the output signal and serves as a buffer between the condenser fan motor 90 and the microprocessor 50. The condenser fan motor 90 also is an ECM motor which is known in the Art and provides for speed control of the motor with the input of a pulse width modulated signal.

The pulse signal on line 64b is fed through resistor 92 and into an optical isolator 94 for achieving electrical isolation. The pulse signal of optical isolator 94 on line 95 is such that during the off portion of the pulse, the signal is not at 0 volts but at some small but significant positive value above 0 volts. This deviation from true 0 volts is corrected by feeding the pulse signal of the optical isolator 94 into CMOS NAND element 96. NAND element 96 inverts the pulse signal on line 95 and provides a pulse signal on line 97 which has a 0 volt value for the off portion of the pulse signal. NAND element 98 inverts the output signal from NAND element 96 so that the digital pulse signal on line 99 is identical to that found on 64b but has been isolated.

The D/A converter 106 comprises a resistor 102 and large capacitor 104 which serve to provide an analog signal output. The pulse signal on line 99 is integrated by resistor 102 and capacitor 104 to provide an analog signal on line 107. This analog signal is fed into an input control pin 108 of the inverter 100. The input control pin 108 provides input to the inverter 100 for controlling the speed of the compressor motor 110 in response to an analog signal. The optical isolator 94 provides for the electrical isolation required with the use of the inverter 100 which has the type of input pin 108 which is not referenced to L1 or N, but rather to the output of a full wave bridge.

Figure 6:
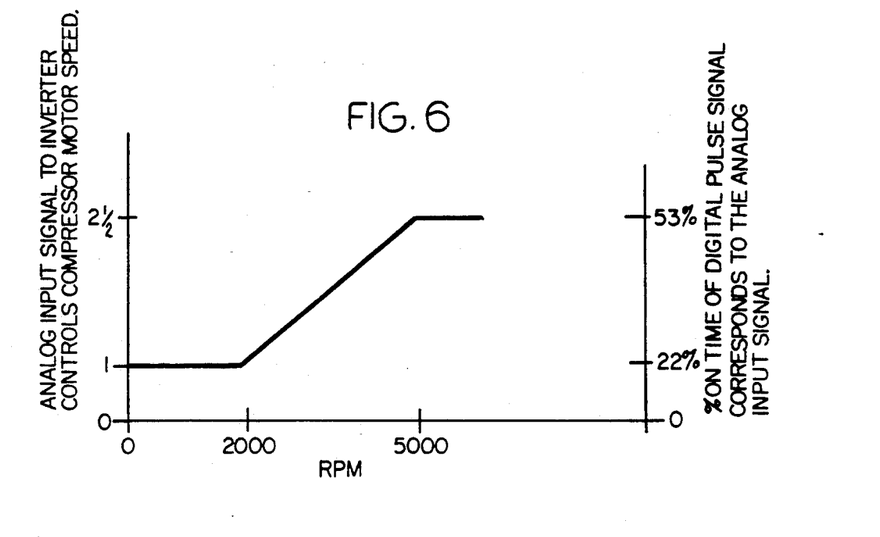
FIG. 6 is a graph of an inverter RPM control profile in accordance with the teachings of the present invention.

Inverter 100 is of a type known in the Art such as disclosed at 10 in U.S. Pat. No. 4,978,895 and has a RPM control profile which is illustrated in FIG. 6. As the analog signal on line 107 is varied, the speed of the compressor motor 110 is varied between 1000-5000 RPM. The corresponding percentage of on time of the digital pulse signal is shown on the right vertical. This corresponding percentage of on time of the modulated pulse signal is a function of the inverter and may be different for a different inverter. In this fashion the pulse signal from microprocessor 50 controls the compressor motor speed.

Figure 7:
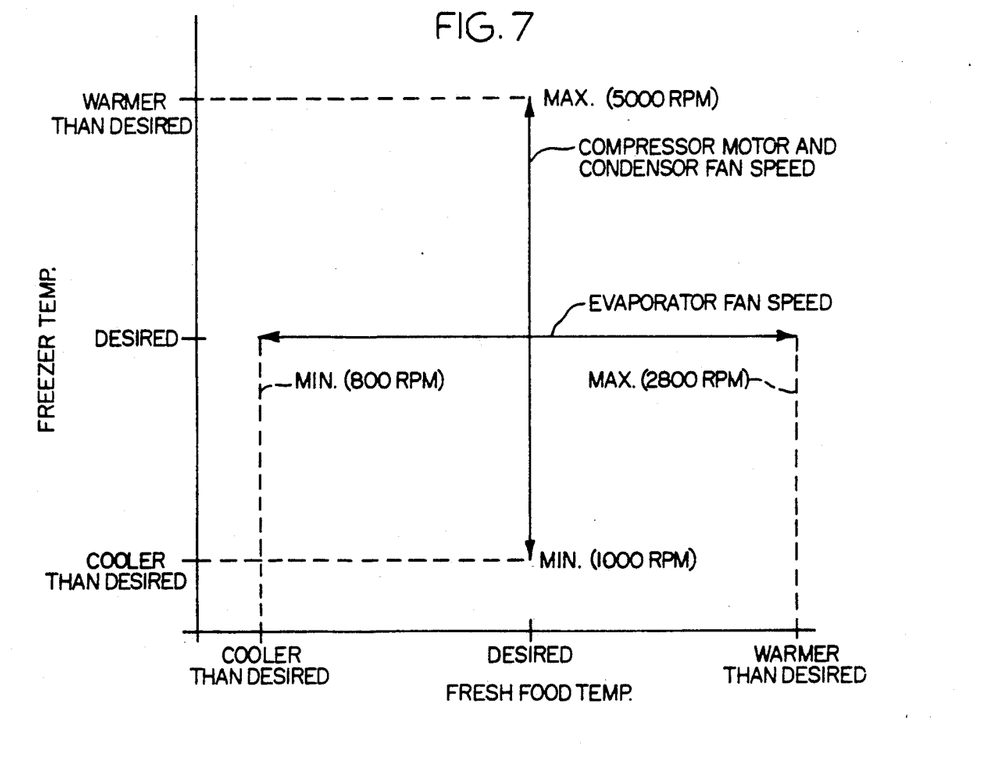
FIG. 7 is a graphical representation of the control scheme of the present invention.

FIG. 7 graphically represents the refrigerator control system of the present invention. The ordinate represents the temperature of the relatively low temperature fresh food compartment 1 and the abscissa represents the temperature of the relatively high temperature freezer compartment 2. The evaporator fan 5 speed is varied (minimum 800 RPM, maximum 2800 RPM) as the temperature of fresh food compartment 1 moves from being cooler than desired to warmer than desired. In this fashion, the desired temperature for fresh food compartment 1 is achieved and maintained. The compressor motor 110 speed and condenser fan 6 speed are varied as the temperature of freezer compartment 2 moves from being cooler than desired to warmer than desired. In this fashion, the desired freezer compartment 2 temperature is achieved and maintained.

Although the present invention has been described with reference to a specific embodiment, those having skill in the Art will recognize that changes may be made thereto without departing from the scope and spirit of the invention as set forth in the appended claims.

I claim:

1. In a refrigerator system having means forming a fresh food compartment, means forming a lower temperature freezer compartment, and a refrigeration system including an evaporator disposed within said freezer compartment, a condenser, and a compressor for compressing a refrigerant in the system, a control arrangement comprising:
   a variable speed motor coupled with said compressor;
   a variable speed evaporator fan for circulating an air stream in a substantially closed loop from said freezer compartment to said fresh food compartment;
   means for responding to the temperature within said fresh food compartment for varying the speed of said evaporator fan such that the temperature of said fresh food compartment is controlled; and
   means for responding to the temperature within said freezer compartment for varying the speed of said compressor motor such that the temperature of said freezer compartment is controlled.

2. In a refrigeration system having a control arrangement as claimed in claim 1 wherein the means for responding to the temperature within the fresh food compartment further comprises:
   a first adjustable temperature setting means for selecting a desired first temperature for said fresh food compartment;
   a first temperature sensing means located within said fresh food compartment having a signal output representative of the temperature within said fresh food compartment; and
   circuitry for performing a first comparison between said signal output of said first temperature sensing means and said desired first temperature, said circuitry further having means for providing speed control signals to said evaporator fan in response to said first comparison for varying the speed of said evaporator fan such that the temperature of said fresh food compartment is maintained at said desired first temperature.

3. In a refrigeration system having a control arrangement as claimed in claim 1 wherein the means for responding to the temperature within the freezer compartment further comprises:
   a second adjustable temperature setting means for selecting a desired second temperature for said freezer compartment;
   a second temperature sensing means located within the freezer compartment having a signal output representative of the temperature within said freezer compartment; and
   circuitry for performing a second comparison between said signal output of said second temperature sensing means and said desired second temperature, said circuitry further having means for providing speed control signals to said compressor motor in response to said second comparison for varying the speed of said compressor motor such that the temperature of said freezer compartment is maintained at said desired second temperature.

4. In a refrigeration system as claimed in claim 3 further comprising:
   a condenser fan for moving the air surrounding said condenser for assisting in heat transfer between said condenser and the surrounding air.

5. In a refrigerator system having means forming a relatively high temperature fresh food compartment, means forming a relatively low temperature freezer compartment, and a refrigeration system including an evaporator, a condenser, a compressor for compressing a refrigerant in the system, an evaporator chamber disposed in said freezer compartment containing said evaporator, and a control arrangement comprising:
   a variable speed motor coupled to said compressor;
   means forming a first air duct connecting the evaporator chamber to the fresh food compartment;
   means forming a second return air duct from the fresh food compartment to the evaporator chamber;
   a variable speed evaporator fan for circulating an air stream in a substantially closed loop including through said first air duct and said second return air duct;
   means for responding to temperature within said fresh food compartment for varying the speed of said evaporator fan such that temperature of said fresh food compartment is controlled; and
   means for responding to temperature within said freezer compartment for varying the speed of said compressor motor such that temperature of said freezer compartment is controlled.

6. In a refrigeration system having a control arrangement as claimed in claim 5 wherein the mean for responding to the temperature within the fresh food compartment further comprises:
   a first adjustable temperature setting means for selecting a desired first temperature for said fresh food compartment;
   a first temperature sensing means located within said fresh food compartment having a signal output representative of the temperature within said fresh food compartment; and
   a microprocessor for performing a first comparison between said signal output of said first temperature sensing means and said desired first temperature, said microprocessor further having means for providing speed control signals to said evaporator fan in response to said first comparison for varying the speed of said evaporator fan such that the temperature of said fresh food compartment is maintained at said desired first temperature.

7. In a refrigeration system having a control arrangement as claimed in claim 5 wherein the means for responding to the temperature within the freezer compartment further comprises:
   a second adjustable temperature setting means for selecting a desired second temperature for said freezer compartment;
   a second temperature sensing means located within the freezer compartment having a signal output representative of the temperature within said freezer compartment; and
   a microprocessor for performing a second comparison between said signal output of said second temperature sensing means and said selected desired second temperature, said processor further having means for providing speed control signals to said compressor motor in response to said second comparison for varying the speed of said compressor motor such that the temperature of said freezer compartment is maintained at said desired second temperature.

8. In a refrigeration system as described in claim 5 further comprising:
   a condenser fan for moving the surrounding air about said condenser for assisting in heat transfer between said condenser and the surrounding air; and
   means for responding to the temperature within said freezer compartment for varying the speed of the condenser fan, said means including said second temperature setting means, said second temperature sensing means and said microprocessor.

9. In a refrigerator having a freezer compartment, a fresh food compartment, and a refrigeration system including a compressor, an evaporator in the freezer compartment, and a condenser, the combination comprising:
   a variable speed motor to drive said compressor;
   means forming an air chamber connecting the freezer compartment to the fresh food compartment;
   means forming a return air duct from the fresh food compartment to the freezer compartment;
   a variable speed evaporator fan to transfer cold air from said freezer compartment to said fresh food compartment;
   a variable speed condenser fan to transfer heat from said condenser to the surrounding air;
   a fresh food temperature control to control the speed of said evaporator fan in response to a sensed fresh food compartment temperature such that said fresh food temperature control causes a change in the evaporator fan speed on sensing of undesired temperature, but no change in the evaporator fan speed on sensing of a desired temperature; and
   a freezer temperature control to control the speed of said compressor motor and said condenser fan in response to a sensed freezer compartment temperature such that said freezer temperature control causes a change in the compressor and condenser fan speeds on sensing of an undesired temperature, but no change in the compressor and condenser fans speeds on sensing of a desired temperature.

10. In a refrigerator system having means forming a relatively high temperature fresh food compartment, means forming a relatively low temperature freezer compartment, and a refrigeration system including an evaporator, a compressor, a condenser, an evaporator chamber disposed within said freezer compartment containing said evaporator, and a control arrangement comprising:
   a variable speed motor having an optimum speed for refrigeration efficiency coupled to said compressor;
   a variable speed condenser fan having an optimum speed for moving air about the condenser for assisting in the transfer of heat from the condenser to surrounding air;
   means forming a first air duct connecting the evaporator chamber to the fresh food compartment;
   means forming a second return air duct from the fresh food compartment to the evaporator chamber;
   a variable speed evaporator fan having an optimum speed for circulating an air stream in a substantially closed loop including through said first air duct and said second return air duct;
   a first temperature setting means having a first predetermined temperature range for selecting a desired first temperature for said fresh food compartment;
   a first temperature sensing means having a first signal output representative of the temperature within said fresh food compartment;
   a second temperature setting means having a second predetermined temperature range for selecting a desired second temperature for said freezer compartment, said second predetermined temperature range being lower than said first predetermined temperature range;
   a second temperature sensing means having a second signal output representative of the temperature within said freezer compartment;
   means for comparing said desired first temperature with said first signal output;
   means for comparing said desired second temperature with said second signal output;
   means for varying the speed of said evaporator fan in accordance with the difference between said first desired temperature and said first signal output such that the speed of said evaporator fan is increased above said optimum speed when said fresh food compartment is warmer than desired and decreased when the fresh food compartment is cooler than desired; and
   means for varying the speeds of said compressor motor and said compressor fan in response with the difference between said second desired temperature and said second signal output such that the speeds of said compressor motor and said compressor fan are increased above said optimum speed when the temperature in said freezer compartment is warmer than desired and the speeds are decreased when said freezer compartment is cooler than desired.

11. A method of cooling a first compartment to a first selected temperature within a first predetermined range of temperatures and cooling a second compartment to a second selected temperature within a second predetermined range of temperatures lower than said first predetermined range of temperatures, comprising:
   sensing a first temperature of a first compartment;

comparing said sensed first temperature with said desired first selected temperature;

varying the operating speed of an evaporator fan in accordance with the difference between said sensed first temperature and said desired first selected temperature, thereby changing a recirculating flow of air through said first compartment and said second compartment to control the temperature of said first compartment;

sensing a second temperature of the second compartment;

comparing said sensed second temperature with the desired second selected temperature; and varying the movement of refrigerant through an evaporator in accordance with the difference between said sensed temperature of said second compartment and the desired second selected temperature, thereby changing the temperature of the air being moved by the fan for temperature control of the second compartment.

12. A method of cooling a first compartment to a first selected temperature within a first predetermined range of temperatures and cooling a second compartment to a second selected temperature within a second predetermined range of temperatures higher than said first predetermined range of temperatures, comprising:

continuously simultaneously circulating a first stream of air in a substantially closed circuit through said first compartment and a second stream of air in a substantially closed circuit through said second compartment;

providing conduit means to create a substantially fixed flow ratio such that said first stream is at a volume rate of flow greater than a volume rate of flow of said second stream;

causing said volume rate of flow of said first stream and said second stream to be varied to maintain the second compartment at said second selected temperature; and causing a rate of flow of refrigerant in an evaporator to be varied to maintain the first compartment at said first selected temperature.

13. In a refrigerator system having means forming a fresh food zone, means forming a lower temperature freezer zone, and a refrigeration system including an evaporator disposed within said freezer zone, a condenser, and a compressor, a control arrangement comprising:

a first independent control system for controlling the temperature of said freezer zone, said first independent control system further comprising:

a variable speed motor coupled to said compressor, means for responding to the temperature within said freezer compartment for varying the speed of said compressor motor such that the temperature of said freezer compartment is controlled; and a second independent control system for controlling the temperature of said fresh food zone, said second independent control system further comprising:

a variable speed evaporator fan for circulating an air stream in a substantially closed loop from said freezer compartment to said fresh food compartment; and means for responding to the temperature within said fresh food compartment for varying the speed of said evaporator fan such that the temperature of said fresh food compartment is controlled.

14. In a refrigeration system having a control arrangement as claimed in claim 13 wherein the means for responding to the temperature within the fresh food compartment further comprises:

a first adjustable temperature setting means for selecting a desired first temperature for said fresh food compartment;

a first temperature sensing means located within said fresh food compartment having a signal output representative of the temperature within said fresh food compartment; and circuitry for performing a first comparison between said signal output of said first temperature sensing means and said desired first temperature, said circuitry further having means for providing speed control signals to said evaporator fan in response to said first comparison for varying the speed of said evaporator fan such that the temperature of said fresh food compartment is maintained at said desired first temperature.

15. In a refrigeration system having a control arrangement as claimed in claim 13 wherein the means for responding to the temperature within the freezer compartment further comprises:

a second adjustable temperature setting means for selecting a desired second temperature for said freezer compartment;

a second temperature sensing means located within the freezer compartment having a signal output representative of the temperature within said freezer compartment; and circuitry for performing a second comparison between said signal output of said second temperature sensing means and said desired second temperature, said circuitry further having means for providing speed control signals to said compressor motor in response to said second comparison for varying the speed of said compressor motor such that the temperature of said freezer compartment is maintained at said desired second temperature.

16. In a refrigeration system as described in claim 15 further comprising:

a condenser fan for moving the air surrounding said condenser for assisting in heat transfer between said condenser and the surrounding air; and means for responding to the temperature within said freezer compartment for varying the speed of the condenser fan, said means for responding to the temperature within the freezer compartment further including said second temperature settings means, said second temperature sensing means and said circuitry.

* * * * *